United States Patent [19]

Ames

[11] Patent Number: 5,467,532
[45] Date of Patent: Nov. 21, 1995

[54] HEDGE TRIMMER AID

[76] Inventor: Sherry A. Ames, 105 Six Rod Rd., Fairfield, Me. 04937

[21] Appl. No.: 262,646

[22] Filed: Jun. 20, 1994

[51] Int. Cl.$^6$ .................................................. B25B 29/00
[52] U.S. Cl. .............................. 33/334; 33/349; 33/378; 56/233
[58] Field of Search ........................... 33/333, 334, 349, 33/354, 370, 371, 373, 377, 378, 383, 399; 7/114, 163; 56/233

[56] References Cited

U.S. PATENT DOCUMENTS

| | | | |
|---|---|---|---|
| 2,452,930 | 11/1948 | Ivey | 33/370 |
| 2,525,387 | 10/1950 | Volk | 33/378 |
| 2,691,829 | 10/1954 | Arana | 33/383 |
| 2,941,307 | 6/1960 | Frisbie | 33/364 |
| 3,540,122 | 11/1970 | Bogdan | 33/334 |
| 4,295,279 | 10/1981 | Sienknecht | 33/334 |
| 4,482,155 | 11/1984 | Higley | 33/389 |
| 4,656,749 | 4/1987 | Ashley et al. | 33/334 |
| 4,794,701 | 1/1989 | Clark | 33/370 |
| 4,908,949 | 3/1990 | Jaccard | 33/334 |

FOREIGN PATENT DOCUMENTS

| | | | |
|---|---|---|---|
| 2220267 | 5/1989 | United Kingdom | 33/399 |

Primary Examiner—William A. Cuchlinski, Jr.
Assistant Examiner—G. Bradley Bennett

[57] ABSTRACT

A hedge trimmer aid including a reference indicator similar to a bubble level wherein an included air bubble is replaced by a small sphere of lower density than a surrounding fluid provides a true horizontal reference, an adjustable pointer with magnifier which is manually set to a particular angular disposition substantially equivalent to the desired angle of the finished trim, and a frame which couples the pointer and the horizontal reference indicators and furthermore affixes the hedge trimmer aid to the static housing portion of a hedge trimmer in clear view of an operator. In use, the angular disposition desired for the hedge is selected and set by rotating the adjustable pointer to a fixed marking disposed upon the surface of a hemispherical bubble level. The hedge trimmer is then manually rotated about a horizontally disposed axis until the colored sphere within the level and a magnifying sight disposed upon the adjustable pointer are in alignment. When alignment is achieved the hedge trimmer blade is angularly disposed to permit cutting at the selected angle. In an alternate embodiment a weighted ball suspended in fluid and free to rotate within a sphere performs the function of the bubble level, and indicia inscribed upon the ball or enclosing sphere are employed to visually indicate the angular disposition of the hedge trimmer blade from the horizontal.

6 Claims, 4 Drawing Sheets

HEDGE TRIMMER AID

BACKGROUND OF THE INVENTION

1. Field of the Invention

The present invention relates to hedge trimming aids and more particularly pertains to a hedge trimming aid which may be employed to enable a human operator to operate a hedge trimmer at any of a series of angles referenced to the vertical.

2. Description of the Prior Art

The use of hedge trimmer aids is known in the prior art. More specifically, hedge trimmer aids heretofore devised and utilized for the purpose of levelling or maintaining any other desirable angle of a hedge trimmer are known to consist basically of familiar, expected and obvious structural configurations, notwithstanding the myriad of designs encompassed by the crowded prior art which have been developed for the fulfillment of countless objectives and requirements.

The present invention is directed to improving devices for trimming hedges at selectable trimming angles in a manner which is safe, secure, economical and aesthetically pleasing.

For example, U.S. Pat. No. 3,540,122 to Bogdan discloses a hedge trimmer and leveling system for same comprising a powered reciprocating blade trimmer having two spirit levels affixed therein. One cylindrical spirit level is employed during trimming to visually indicate maintenance of the trimmer in a horizontal plane, and the second cylindrical spirit level is employed to visually maintain the trimmer in a substantially vertical trimming position. The present invention is affixable to any hedge trimmer and does not treat any portion of the trimming functional apparatus. And furthermore, the present invention is devised to provide visual indication of several hedge trimmer alignments of which true horizontal is but one possible disposition. The present invention achieves a greatest utility when trimming hedges requiring an angular finished cut to follow undulating ground contours or to neatly match taller and shorter adjoining hedge portions.

In U.S. Pat. No. 4,794,701 to Clark a level device for a chainsaw is disclosed. The Clark invention comprises a transparent tube filled with colored liquid and having a small ullage in the form of a single bubble therein performing the function of a dual axis spirit level. Indicia enscibed upon the ends and top of the tube are employed to visually indicate alignment with true vertical or horizontal for a chainsaw to which said tube is affixed. The present device visually indicates alignments of a hedge trimmer at selected angles including horizontal and is employed to aid in trimming hedges wherein angular finished cuts are required.

In U.S. Pat. No. 4,295,279 to Sienknecht a hand tool leveling apparatus is described wherein both a cylindrical and a circular bubble level are affixed to or integrated within a hand tool such as an electric drill. The circular bubble level provides a visual indication of maintenance of true vertical and the cylindrical level provides an indication of maintenance of true horizontal when the tool is operated. The present invention employs an indicating device, which in one embodiment is similar in several aspects to a bubble level, permitting alignment of a hedge trimmer at various angles one of which is necessarily true horizontal.

In U.S. Pat. No. 4,656,749 to Ashley, et al. a hand drill level is disclosed for providing a visual indication of the horizontal alignment of an operably disposed drill bit. A disadvantage in this prior art lies in a lack of a provision for aligning a hand tool at angles other than the horizontal. The present invention permits alignment of a hedge trimmer at various angles representing substantial departures from the horizontal and thereby permits trimming of hedges requiring angular cuts.

U.S. Pat. No. 4,908,949 to Jaccard discloses an air-bubble level for portable tools. The disclosure teaches a bubble level affixing to a portable tool thereby providing a visual indication of the horizontal. The disclosure makes no provision for alignment of a hedge trimmer at angles deviating from the horizontal. The present invention provides a visual indication of the alignment of a hedge trimming tool with respect to any of several angles including true horizontal.

In this respect, the hedge trimmer aid according to the present invention substantially departs from the conventional concepts and designs of the prior art, and in so doing provides an apparatus primarily developed for the purpose of providing a visual indication of the alignment of a power hedge trimmer for the purpose of maintaining the cutting blades of the hedge trimmer at a particular angular disposition.

Therefore, it can be appreciated that there exists a continuing need for new and improved hedge trimmer aid which can be employed to aid in performing neat hedge trimming particularly in circumstances wherein the hedge is required to be trimmed at some angle to true horizontal. In this regard, the present invention substantially fulfills this need.

As illustrated by the background art, efforts are continuously being made in an attempt to improve devices for visually indicating the level condition of a tool. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of portable tool alignment devices now present in the prior art, the present invention provides an improved hedge trimmer aid construction wherein the same can be utilized for employing visual feedback to control and maintain the angular disposition of a hedge trimmer blade when operationally disposed. As such, the general purpose of the present invention, which will be described subsequently in greater detail, is to provide a new and improved hedge trimmer aid apparatus and method which has all the advantages of the prior art portable tool alignment devices and none of the disadvantages.

The invention is defined by the appended claims with the specific embodiment shown in the attached drawings. For the purpose of summarizing the invention, the invention may be incorporated into an indicating device affixed in plain view to a portion of a hedge trimmer fixed blade. The hedge trimmer aid displays the angular disposition of the hedge trimmer cutting blade in a manner that enables the operator to preserve the angular disposition throughout a trimming operation and thereby perform a substantially accurate angular trimming of hedges.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a hedge trimmer aid having a visual indication of the angular deviation of a plane containing a substantially flattened hedge trimmer blade and true horizontal.

It is therefore an additional object of the present invention to provide a new and improved hedge trimmer aid which has all the advantages of the prior art hedge trimmer aids and none of the disadvantages.

It is another object of the present invention to provide a new and improved hedge trimmer aid which may be easily and efficiently manufactured and marketed.

It is a further object of the present invention to provide a new and improved hedge trimmer aid which is of a durable and reliable construction.

An even further object of the present invention is to provide a new and improved hedge trimmer aid which is susceptible of a low cost of manufacture with regard to both materials and labor, and which accordingly is then susceptible of low prices of sale to the consuming public, thereby making such hedge trimmer aids economically available to the buying public.

Still yet another object of the present invention is to provide a new and improved hedge trimmer aid which provides in the apparatuses and methods of the prior art some of the advantages thereof, while simultaneously overcoming some of the disadvantages normally associated therewith.

Still another object of the present invention is to provide a new and improved hedge trimmer aid which enables an unskilled hedge trimmer operator to cut hedges at selected angles including true horizontal.

Yet another object of the present invention is to provide a new and improved hedge trimmer aid which is attachable by persons of average skill to existing hedge trimmers.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
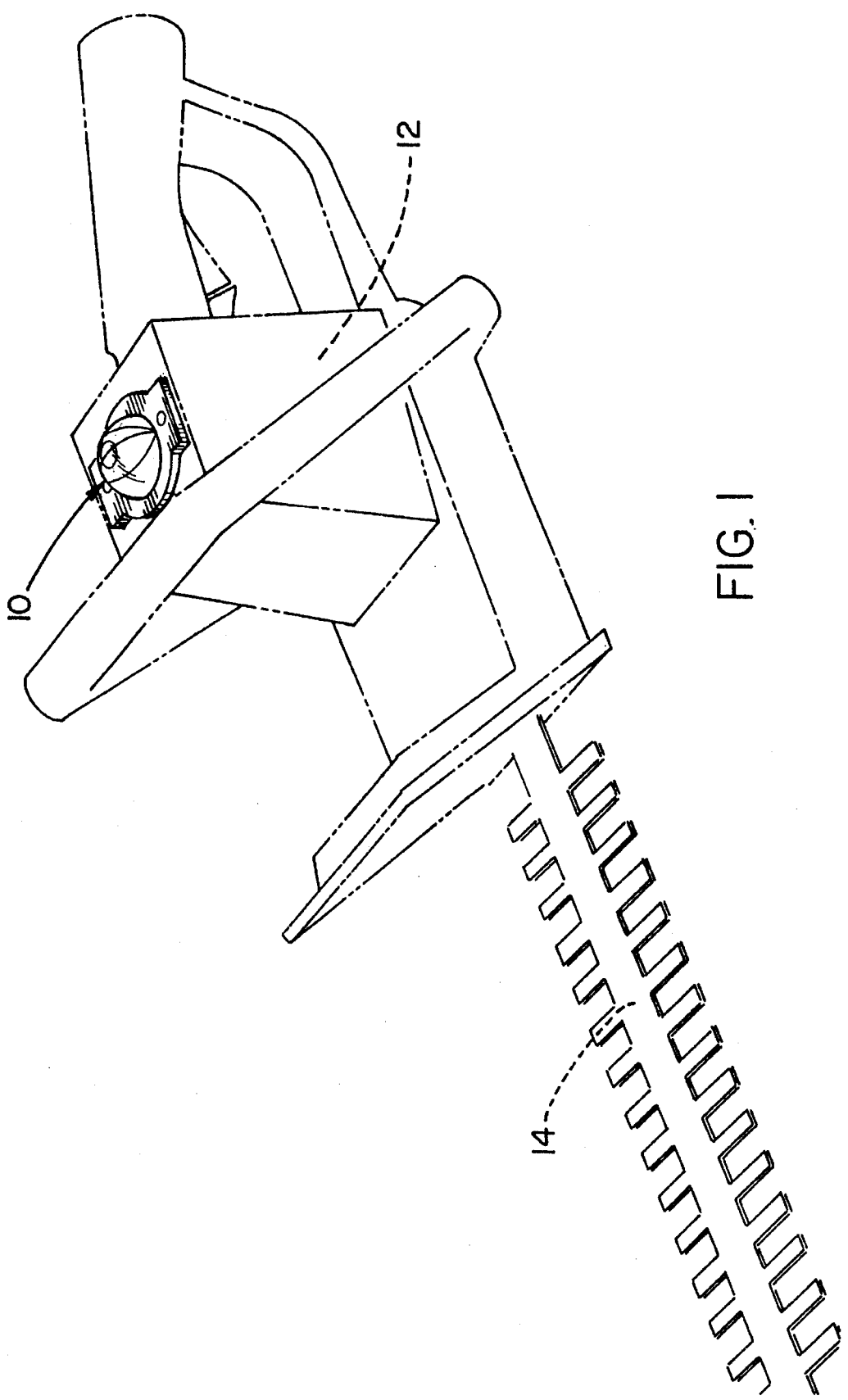
FIG. 1 is a perspective view of the hedge trimmer aid showing the hedge trimmer aid attaches to the housing of a hedge trimmer.

With reference now to the drawings, and in particular to FIG. 1 thereof, a new and improved hedge trimmer aid embodying the principles and concepts of the present invention and generally designated by the reference numeral 10 will be described.

Figure 2:
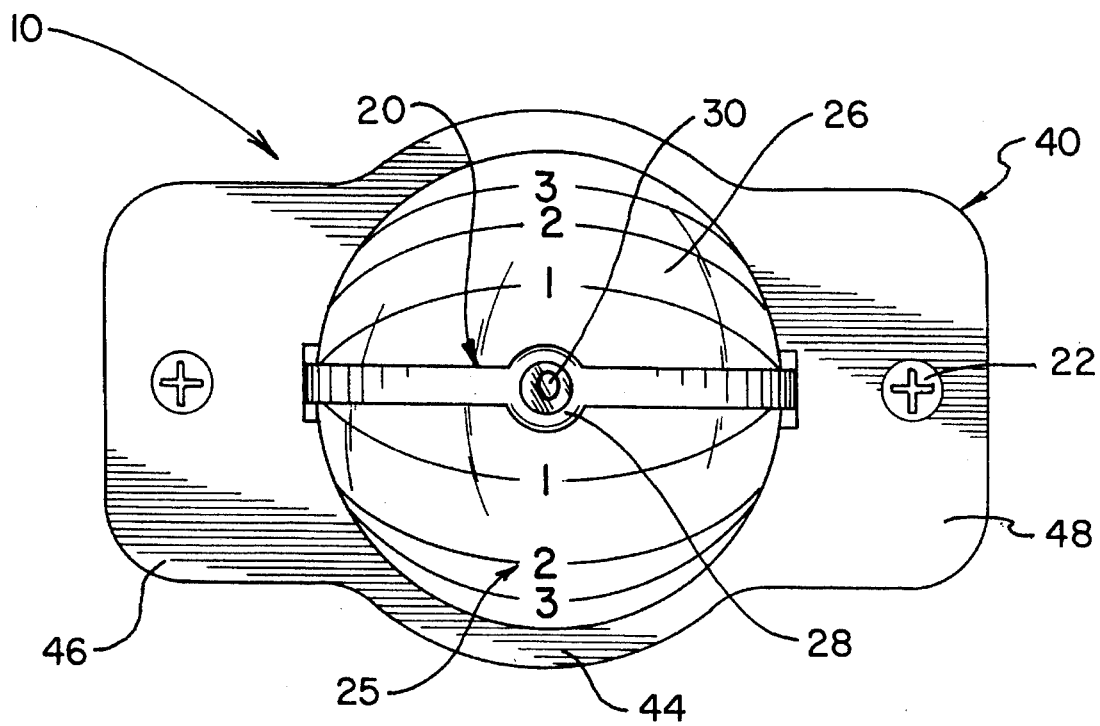
FIG. 2 is a plan view of the hedge trimmer aid in a horizontal cut indicating position.

From an overview standpoint, the hedge trimmer aid 10 is adapted for use with a reciprocating blade type power hedge trimmer 12 wherein the hedge trimmer aid 10 is affixed to a housing portion 13 in plain view of the operator. See FIG. 1. The hedge trimmer aid 10 comprises an indicator displaying an angular deviation from true horizontal and furthermore having a manually moveable pointer device 20 which is employed as a visual reference thereby enabling substantially accurate reproduction of particular angular dispositions of blade portion 14. See FIG. 2.

Figure 3:
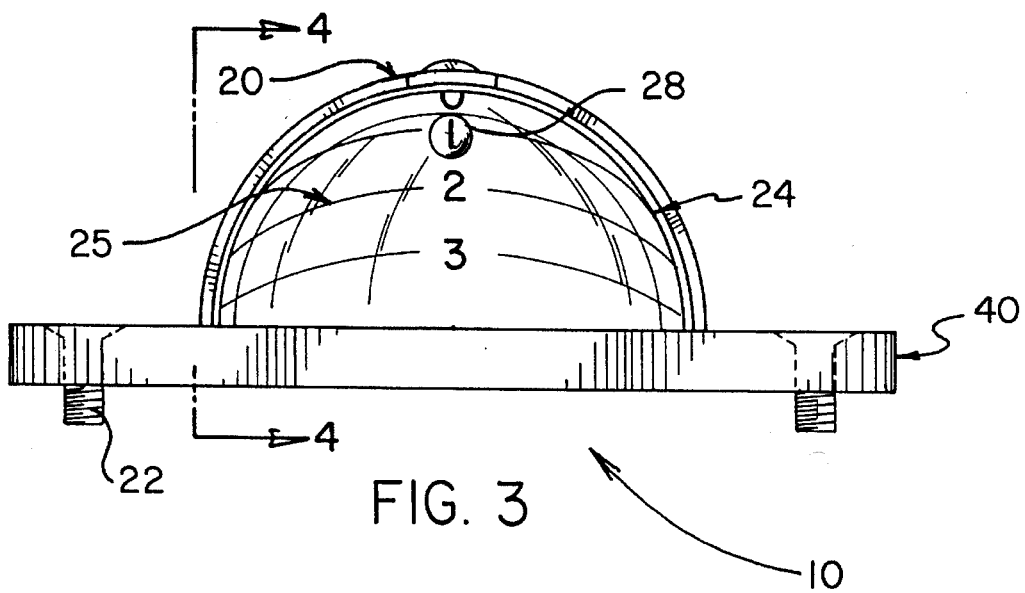
FIG. 3 is side elevational view of the hedge trimmer aid showing a bolt fastening means and an external indicator.

More specifically, it will be noted that the hedge trimmer aid 10 is affixed to the housing portion 13 of hedge trimmer 12 using flat head mounting bolts 22 threadedly engaging holes formed in housing portion 13. Hemispherical shell 24 is relatively thick walled and durable, transparent, and sealed to retain an internal fluid 26. See FIG. 3. Indicia 25 including linear and numerical inscriptions may be included to represent arbitrary angular dispositions of pointer device 20 or these may be calibrated to represent actual angular dispositions of the hedge trimmer static blade portion 14 with respect to true vertical or horizontal.

Inscribed indicia 25 may be colored using highly visible inks or paints. Internal fluid 26 fills the entirety of shell 24 and the ullage, generally forming bubble, is minimized to preclude dispersal under vibration. A small colored ball 28 of substantially spherical shape and having a lesser specific gravity than fluid 26 serves as an indication of the alignment of the hedge trimmer aid 10. Maintenance of the ball 28 at magnifying sight 30 of pointer device 20 presents a satisfactory operating mode of the hedge trimmer aid 10 and provides a horizontal angular disposition of the blade portion 14 equivalent to an angle formed by pointer device 20 and the static blade portion 14 in the general direction of cut and furthermore, provided that ball 28 is maintained centrally disposed and visible within magnifying sight 30, the angular disposition of the blade portion 14 in a direction orthogonally disposed to the cutting direction is substantially maintained true horizontal. A prerequisite to trimming at a specific angle verses a relative angle is that a plane containing the static blade portion 14 and a plane containing the surface of housing portion 13 to which the hedge trimmer aid 10 is affixed are substantially parallel.

Internal fluid 26 may respond to vibrations of the hedge trimmer 12 during use by creating a plurality of bubbles or the ball 28 may move rapidly and provide erroneous alignment indications in response to accelerations of fluid 26 in a phenomenon commonly referred to as sloshing. Control of the viscosity and surface tension of internal fluid 26 may be employed to eliminate bubble breakup and sloshing. And furthermore a hedge trimmer aid 10 having a relatively viscous internal fluid will perform mechanical integration of rapid, inconsequential accelerations and angular deviations thereby providing the user with a more stable visual cutting indication which should have a generally beneficial impact on user comfort and final results of the trimming operation.

Figure 4:
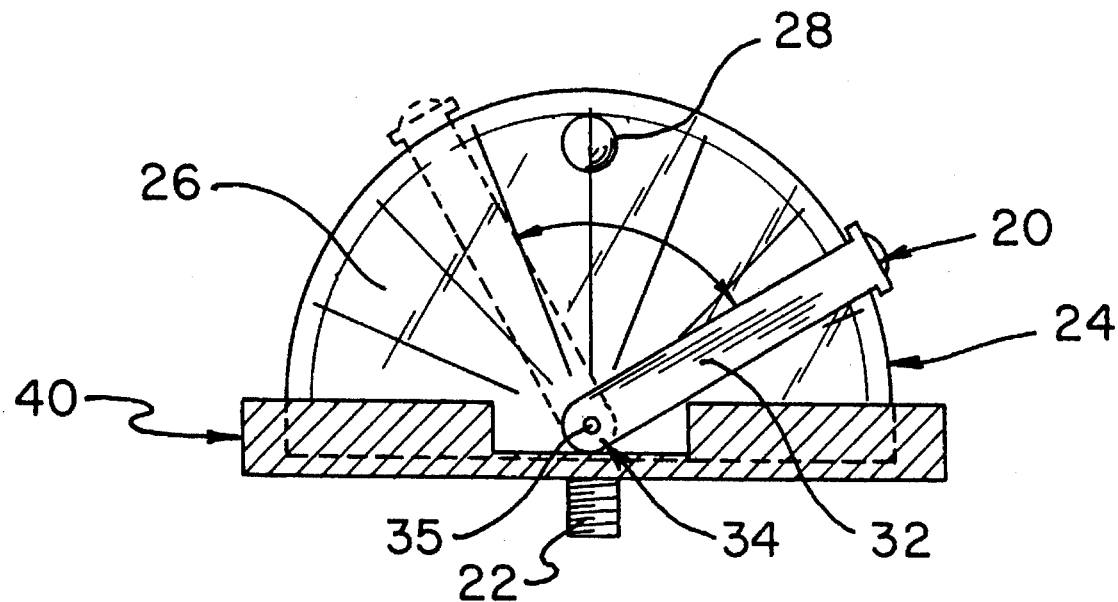
FIG. 4 is a sectional view of the hedge trimmer aid taken substantially upon a plane indicated by the section line 4—4 of FIG. 3.
Figure 5:
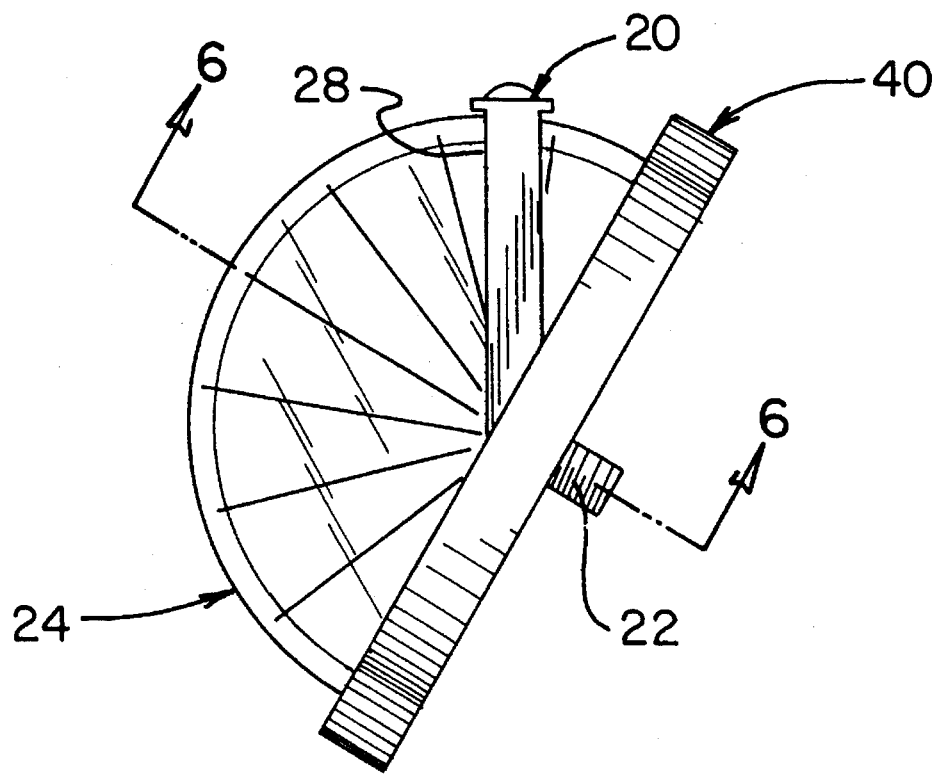
FIG. 5 is a perspective view of a hedge trimmer aid in an angle maintenance position.
Figure 6:
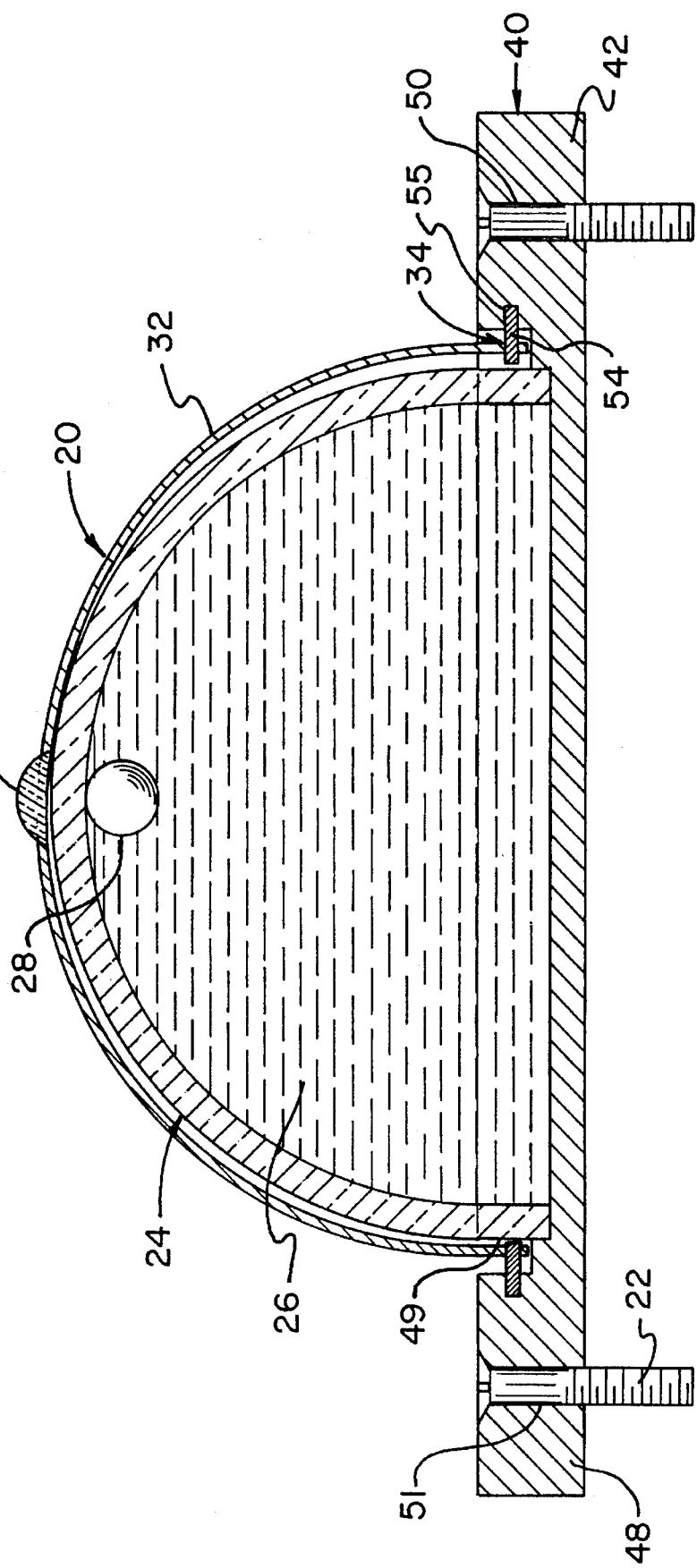
FIG. 6 is a sectional view of the hedge trimmer aid taken substantially upon the plane indicated by section lines 6—6 of FIG. 5.

Although a clear internal fluid 26 is suitable for general use, various colorants may be employed to provide varying degrees of aesthetic and potentially functional advantages. Pointer device 20 comprises a generally semi-circular shaped member 32 having a magnifying sight 30, shaft portions 32, and a pivotal engagement portion 34. See FIGS. 4 and 5. Magnifying sight 30 is designed to clearly indicate both an alignment with linear indicia 25 inscribed on the hemispherical shell 24 and alignment with ball 28, and furthermore the center of magnifying sight 30 terminates midway along a semicircle aligned with shaft portion 32 and lying entirely within a surface of hemispherical shell 24. Magnifying sight 30 comprises a glassy, transparent convex lens or Fresnel lens and magnifies ball 28. See FIG. 6. Shaft portion 32 is substantially flattened and has a curvature generally following the spherical curvature of hemispherical shell 24.

Pivotal engagement portion 34 comprises a hole 35 for engagement of a pivot shaft 54 described subsequently. Base member 40 comprises a plate 42 having a substantially circular center portion 44, a first tab portion 46 and a second tab portion 48 wherein said tab portions are oppositely disposed upon an extension of the diameter of circular center portion 44. Circular center portion 44 has a cylindrical cavity 49 having an axis passing through the center of circular portion 44, a diameter somewhat larger than the overall diameter of hemispherical shell 24, and a depth established as a portion of the thickness of plate 42.

Hemispherical shell 24 is adhesively bonded within cylindrical cavity 49. Through holes or alternate structure may be provided in the material of plate 42 remaining in the cylindrical cavity 49 region and being disposed beneath the hemispherical shell 24 for the purpose of material stabilization and adhesive bonding. First tab portion 46 is perforated by through hole 50 wherein a mounting bolt 22 is disposed. First tab portion 46 also includes pivot shaft 54 which frictionally engages hole 55 within base member 40 wherein manual movement of pointer device 20 for the purpose of achieving a particular angular setting is achieved with some resistance therefore pointer device 20 remains fixed in position after adjustment although the hedge trimmer aid 10 may be vibrating and otherwise moving in the operational environment.

Second tab portion 48 is perforated by a through hole 51 wherein a mounting bolt 22 is disposed. In one operating mode, the hedge trimmer 12 is held at the correct horizontal angular disposition required for trimming and pointer device 20 is rotated to align point 30 with the center of ball 28. The trimming operation may then begin as hedge trimmer 12 is manually caused to proceed in directions wherein hedge members are engaged in the plane of the hedge trimmer static blade 14 whilst ball 28 is maintained at the center of magnifying sight 30. In a second operating mode which involves having a knowledge of the angle the trimmed hedge must achieve with respect to the horizontal, the pointer device 20 is initially set to the appropriate indicia 25 inscribed upon the hemispherical shell 24 thereby setting the angular disposition of the static blade portion 14.

An operator performing a trimming operation of any mode or style must raise and lower hedge trimmer 12 as the trimming operation proceeds in order to produce an angular trim of an entire hedge segment. Hedge trimmer 12 raising and lowering is facilitated by the width of the hedge trimmer blade static portion 14 which, having an underside, can slidably engage several just cut hedge boughs having an angular disposition, imparted by an initial angularly disposed cut, and forming a sloping surface for continued hedge trimming. The hedge trimmer aid 10 thereafter is employed to maintain the angularity of cut boughs through minor corrections as the hedge trimmer 12 is moved up, down, or horizontally along the desired finish trim slope.

In an alternate embodiment, the hedge trimmer aid 10 may be attached to housing portion 13 using adhesives such as tapes or glue bonding agents.

In another alternate embodiment the hedge trimmer aid 10 may be attached to a static portion of blade 14.

In yet another alternate embodiment of the hedge trimmer aid 10 a horizontal plane visual reference is provided by a damped pendulum such as a ball weighted at a site near its periphery and constrained within a sphere wherein buoyant support and frictional control is provided by a liquid fill. In one approach, indicia marked on said ball indicate true horizontal and the various angular dispositions desired disposed around the ball surface. A single reference mark on the spherical shell is required to permit visual alignment of the hedge trimmer 12 at desirable angles. In a second approach the ball has a single reference mark located at a surface site directly opposing the weight application site and the spherical shell has a plurality of markings.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

What is claimed as being new and desired to be protected by LETTERS PATENT of the United States is as follows:

1. A new and improved hedge trimmer aid for visually indicating the angular cutting disposition of a hedge trimmer comprising:

a true horizontal reference means having a visual indication of the disposition of a plane to the true or earth horizontal, an adjustable indicator means which provides an indication of a selected angular disposition of said plane, and a frame for mounting said true horizontal reference means and said adjustable indicator means to a hedge trimmer wherein the plane is maintained substantially within the plane of the hedge trimmer cutting blade and furthermore the adjustable indicator means and the true horizontal reference means are coupled thereby enabling a visual indication of a condition wherein the selected angular disposition of said plane is substantially the angular disposition of said plane referenced to true horizontal.

2. The new and improved hedge trimmer aid of claim 1 in which said true horizontal reference comprises:

a substantially transparent hemispherical sealed compartment comprising a hemispherical shell and a planar base adhesively bonded to form said seal the free volume of which is filled by a fluid, and a small colored, ballike member having a specific gravity diminished from that of the fluid disposed within said fluid and sealed within the hemispherical shell.

3. The new and improved hedge trimmer aid of claim 2 wherein said adjustable indicator means include a marking indicating the position of the ballike member whenever the planar base lies substantially in a true horizontal plane.

4. The new and improved hedge trimmer aid of claim 3 in which said adjustable indicator means include a plurality of markings indicating the position of the ballike member whenever the planar base lies substantially at selected angles referenced to true horizontal.

5. The new and improved hedge trimmer aid of claim 1 in which said adjustable indicator means comprises a pointer generally curvedly following the surface of a hemispherical shell having:

an enlarged central portion which has a small glassy convex lens type magnifier sight disposed therein and a clear aperture permitting light emerging from a colored ballike member to travel through the magnifier and be converged in passage therethrough thereby presenting a magnified image of the colored ballike member upon visual inspection thereof, a first centrally disposed shaft portion comprising an elongated substantially flattened member interconnecting a first pivot engagement portion and the central portion, an a second centrally disposed shaft portion comprising and elongated substantially flattened member interconnecting a second pivot engagement portion wherein said first and second pivot engagement portions are coaxially disposed and lie in opposition substantially upon a diameter of said hemispherical shell, and the first and second pivot engagement portions which pivotally affix the pointer to the frame and furthermore provides frictional engagement of said pointer thereby requiring applied force for repositioning thereof.

6. The new and improved hedge trimmer aid of claim 1 in which said frame comprises a flattened plate having:

a first tab portion comprising a substantially rectangular shape and having a single through hole loosely engaging mounting bolts and furthermore having an attachment means for a first pivot engagement portion of the indicator means, a second tab portion comprising a substantially rectangular shape and having a single through hole loosely engaging mounting bolts and furthermore having an attachment means for a second pivot engagement portion of the indicator means, and a circular central portion interconnecting said first and second tab portions and furthermore having a cylindrical cavity centrally disposed therein wherein said cylindrical cavity engages said true horizontal reference means which is adhesively affixed therein.

\* \* \* \* \*